United States Patent
Morris

(10) Patent No.: US 6,361,121 B1
(45) Date of Patent: Mar. 26, 2002

(54) PLASTIC WHEEL ASSEMBLY AND IMPROVED MOUNTING SLEEVE THEREFOR

(75) Inventor: Michael A. Morris, Menlo Park, CA (US)

(73) Assignee: GEO Plastics, Oakland, CA (US)

( * ) Notice: Subject to any disclaimer, the term of this patent is extended or adjusted under 35 U.S.C. 154(b) by 0 days.

(21) Appl. No.: 09/687,669

(22) Filed: Oct. 12, 2000

Related U.S. Application Data

(63) Continuation-in-part of application No. 09/507,595, filed on Feb. 18, 2000.

(51) Int. Cl.$^7$ ............................................. B60B 23/00
(52) U.S. Cl. ........................................ 301/112; 301/131
(58) Field of Search ................................. 301/111, 112, 301/118, 131, 132

(56) References Cited

U.S. PATENT DOCUMENTS

| | | | | |
|---|---|---|---|---|
| 486,023 | A | * 11/1892 | Bermel | ........................ 301/118 |
| 2,978,277 | A | 4/1961 | Gaudry | |
| 3,907,370 | A | 9/1975 | Bard | |
| 5,215,356 | A | * 6/1993 | Lin | ............................. 301/111 |
| 5,222,786 | A | 6/1993 | Sovis et al. | |
| 5,277,480 | A | * 1/1994 | Chiu | ........................... 301/111 |
| 5,603,555 | A | 2/1997 | Dickey et al. | |
| 5,716,107 | A | * 2/1998 | Parker et al. | ................. 301/111 |
| 5,902,018 | A | * 5/1999 | Owen et al. | ................. 301/111 |
| 6,099,083 | A | * 8/2000 | Logan | .......................... 301/111 |
| 6,280,001 | B1 | * 8/2001 | Parker et al. | ................. 301/112 |

FOREIGN PATENT DOCUMENTS

EP 180307 * 5/1986 ................. 301/111

* cited by examiner

*Primary Examiner*—S. Joseph Morano
*Assistant Examiner*—Long Bao Nguyen
(74) *Attorney, Agent, or Firm*—Flehr Hohbach Test Albritton & Herbert LLP

(57) ABSTRACT

A plastic wheel (22, 122) and wheel mounting sleeve (27, 27a, 127) used to releasably secure the wheel (22, 122) onto an axle (23, 123). The wheel mounting sleeve (27, 27a, 127) preferably includes a resilient, radially displaceable, axially extending, cantilevered finger (46, 146) which includes an axle-engaging lug (55, 155), while a wheel-engaging shoulder is provided on an annular rib 101, 201. The respective sleeve shoulders cooperate with oppositely facing shoulders on the wheel so as to latch the sleeve (27, 127) to the axle (23, 123) and the wheel (22, 122) to the sleeve (27, 127). The sleeve (27, 127) and sleeve-receiving bore (39a, 39b, 139a, 139b) are radially inwardly stepped on the inner side (66, 166) as compared to the outer side (67, 167) of the wheel. Assembly can be accomplished without any tools, and a pointed tool can be used to puncture a skin (195) in a passageway (191) so as to enable release of the sleeve (27, 127) and wheel (22, 122) from the axle (23, 123).

22 Claims, 7 Drawing Sheets

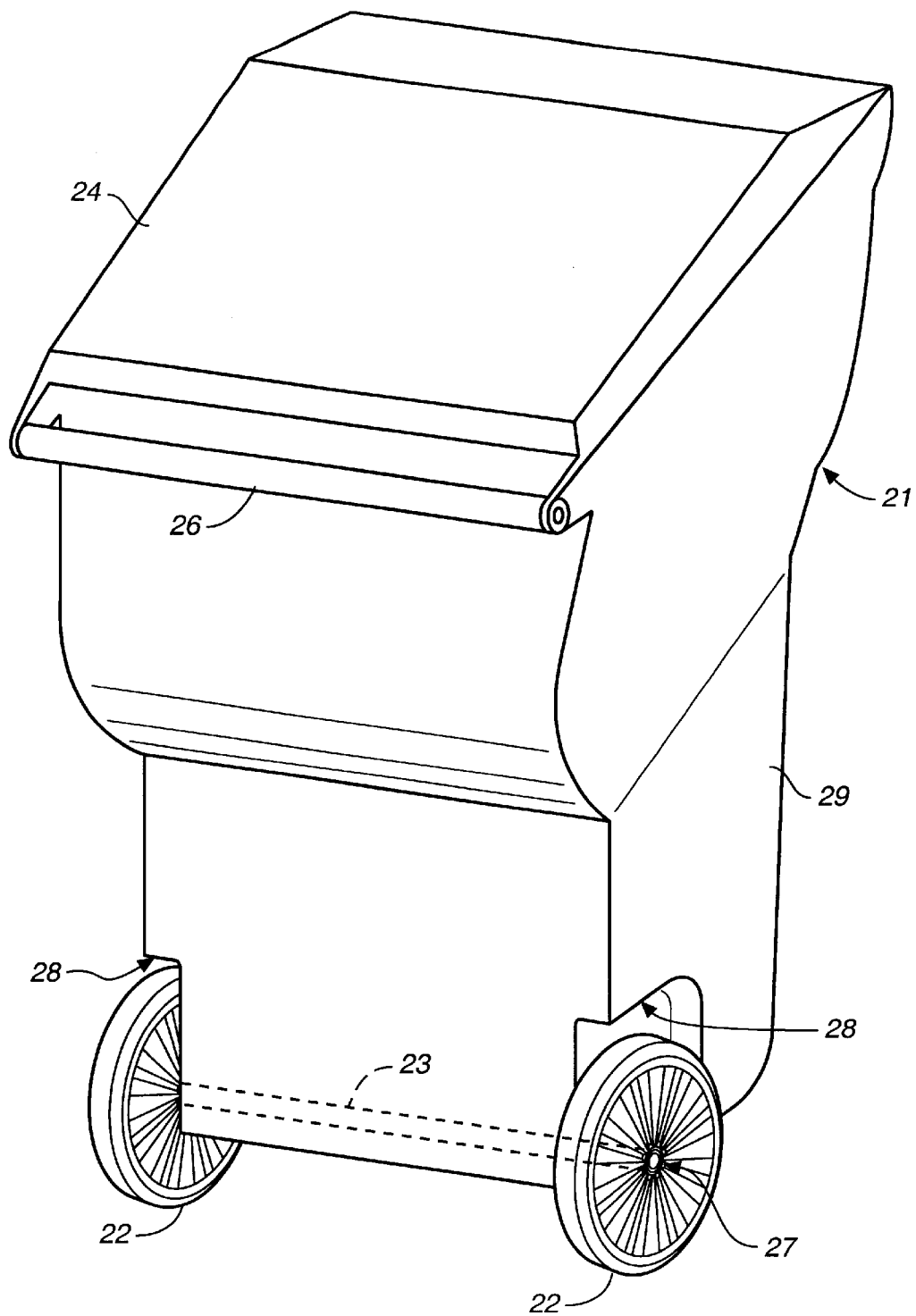
FIG._1

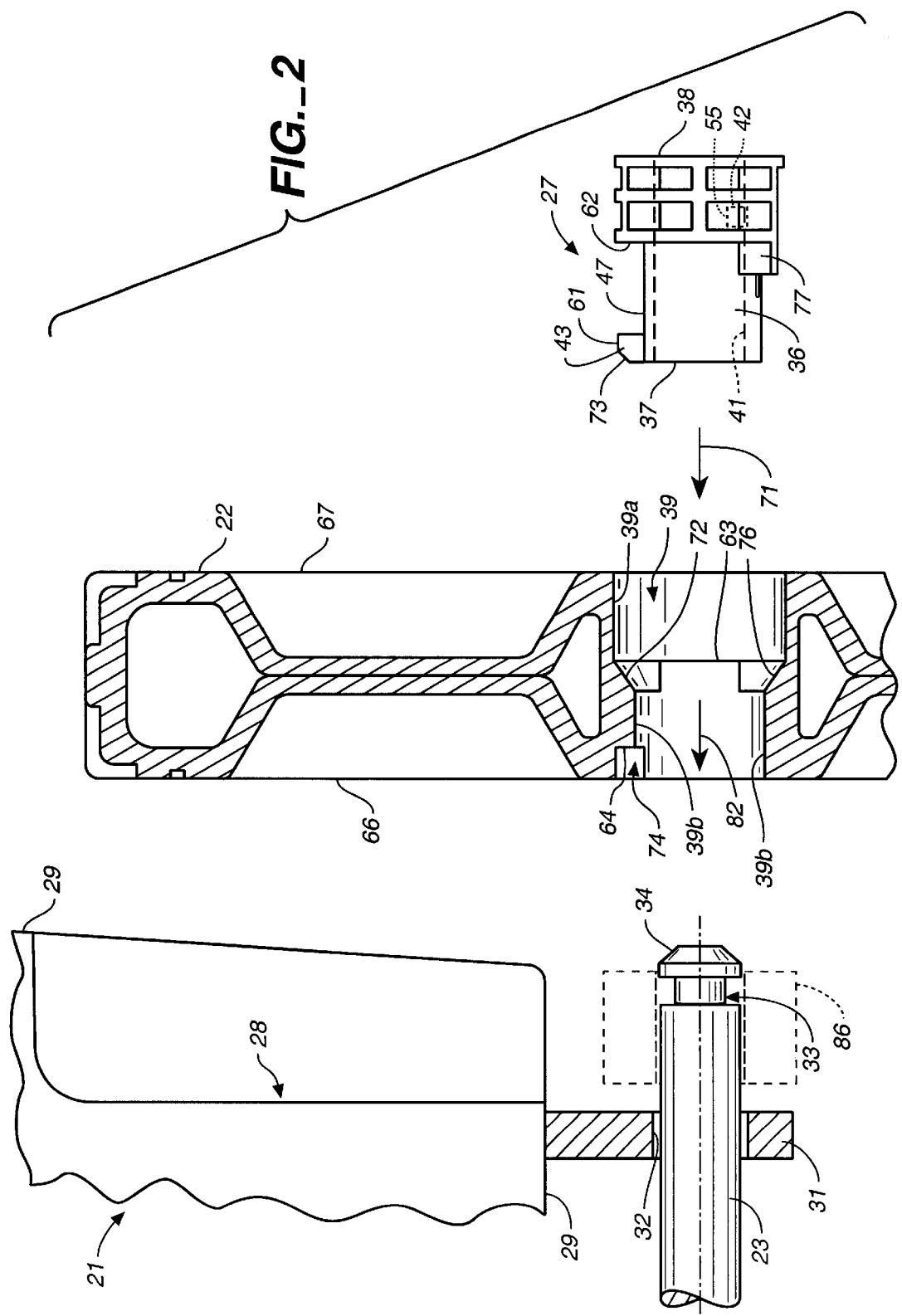

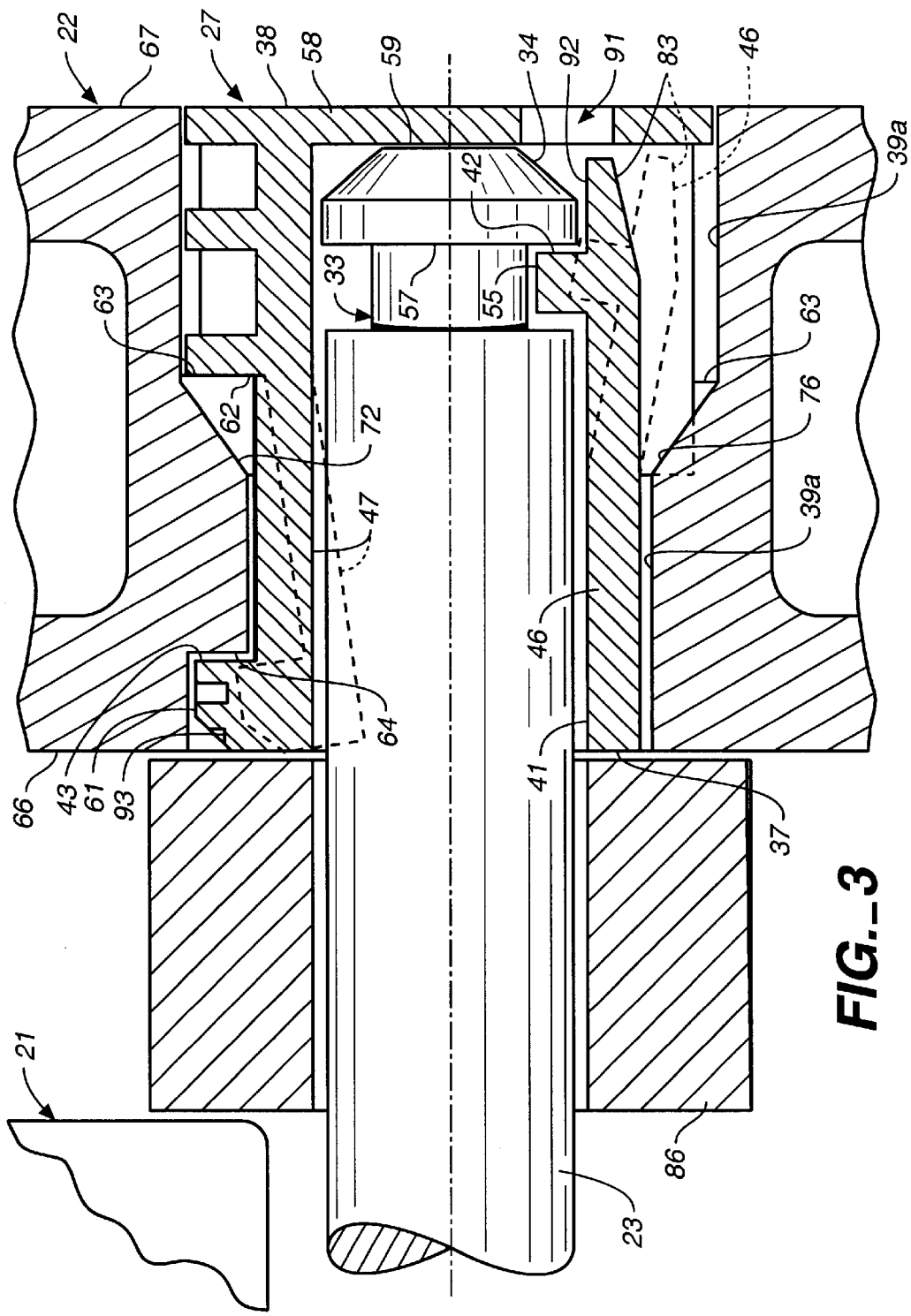
FIG._3

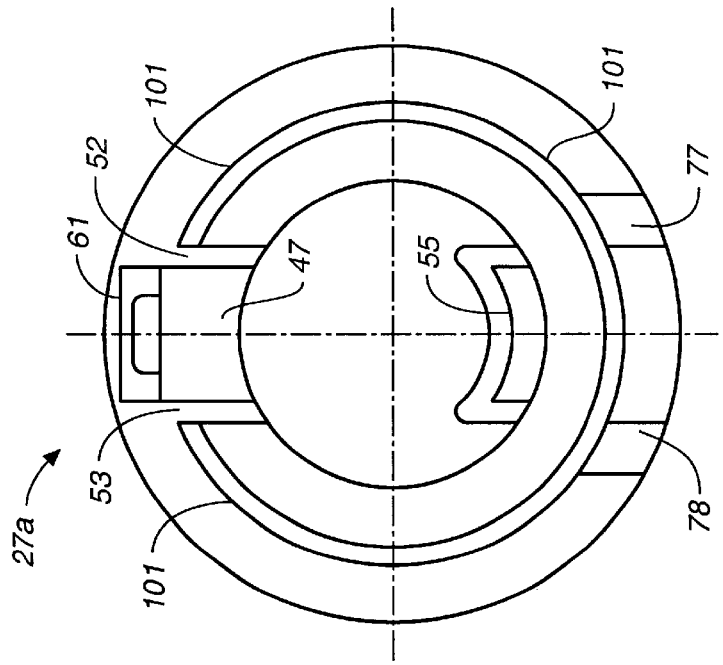
*FIG._5*
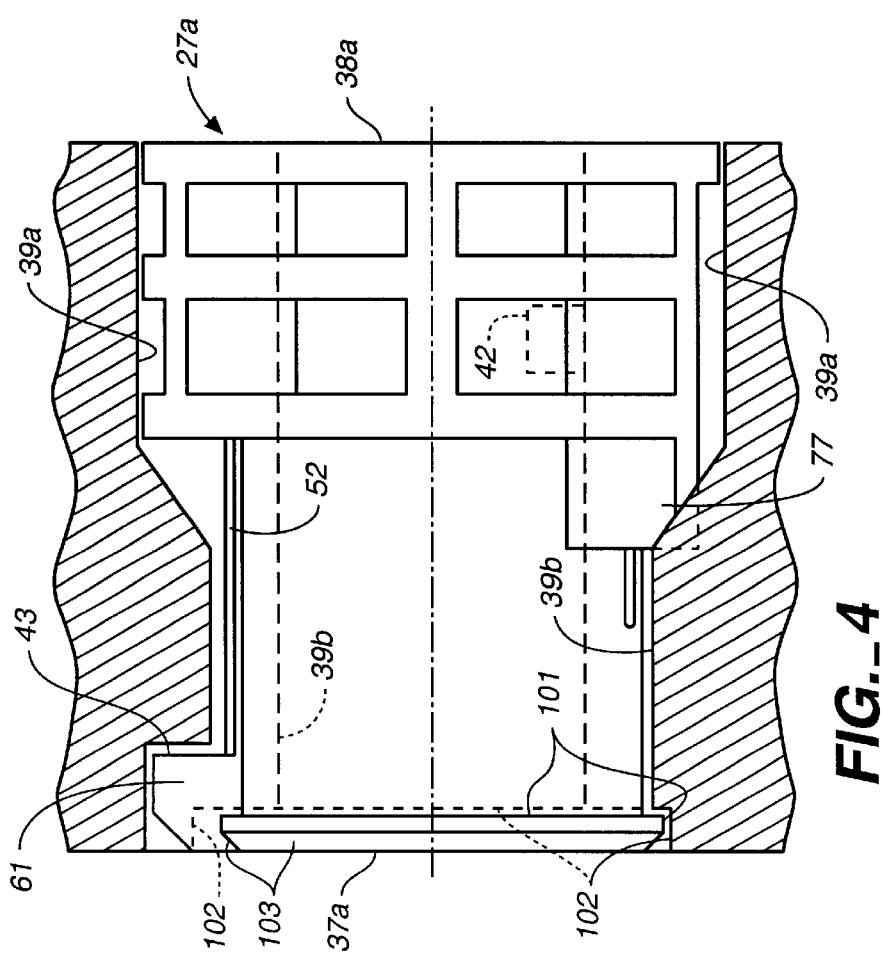
*FIG._4*

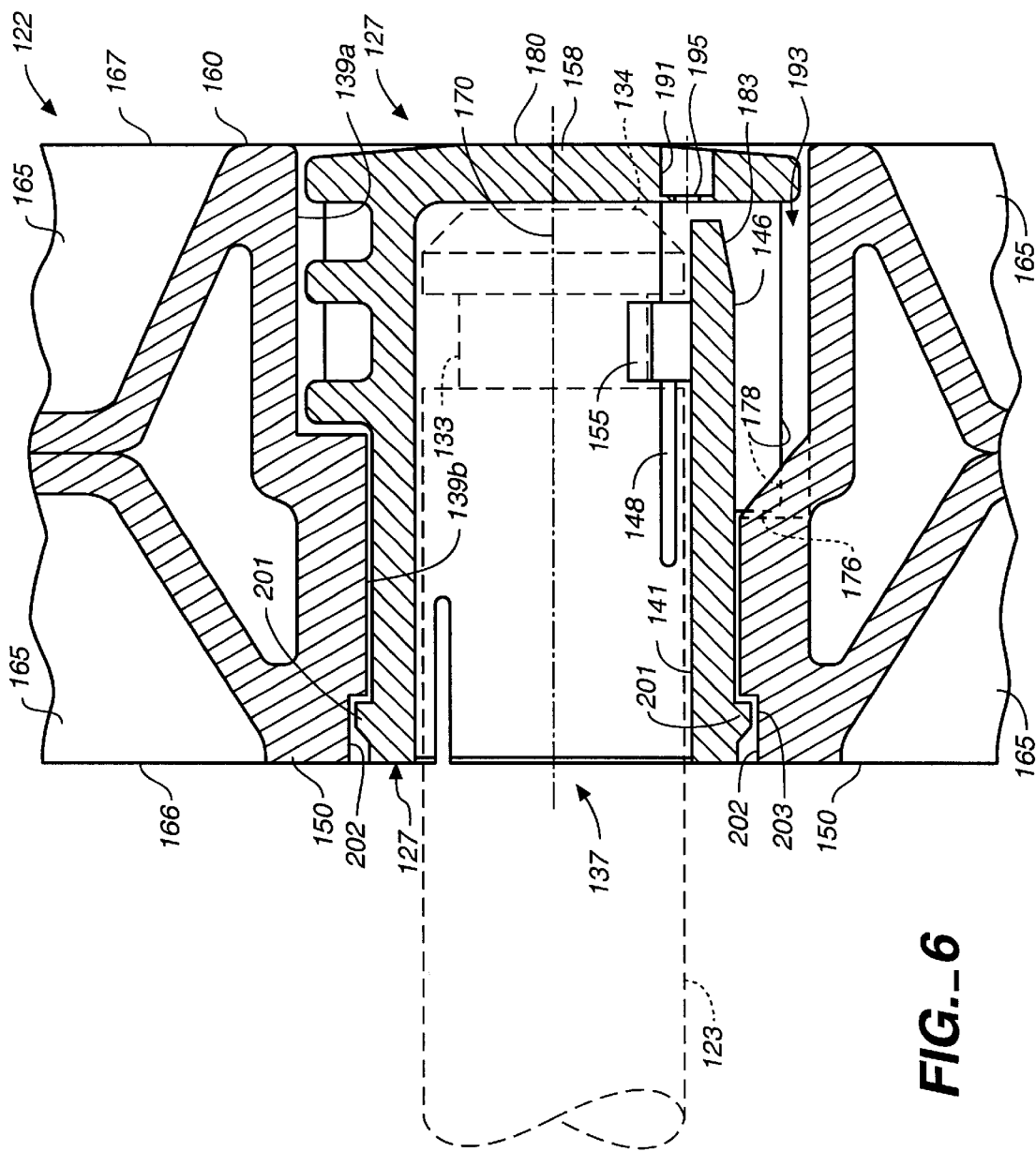
FIG._6

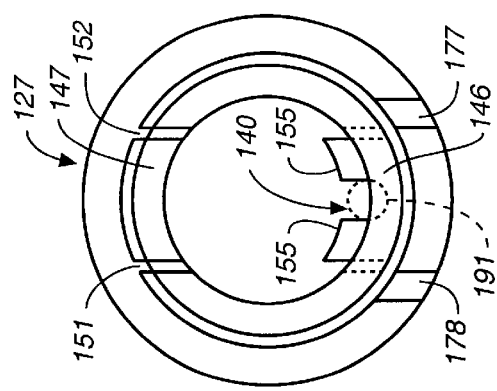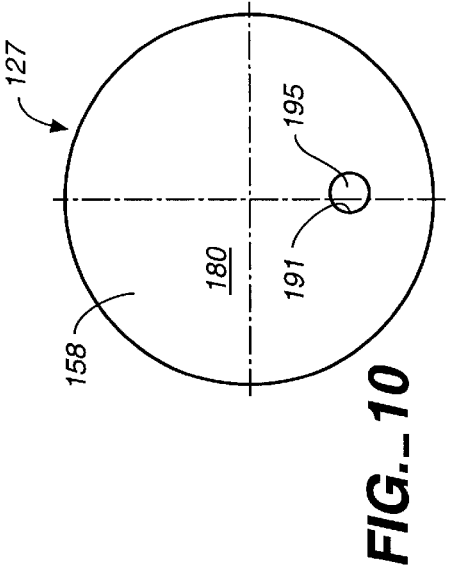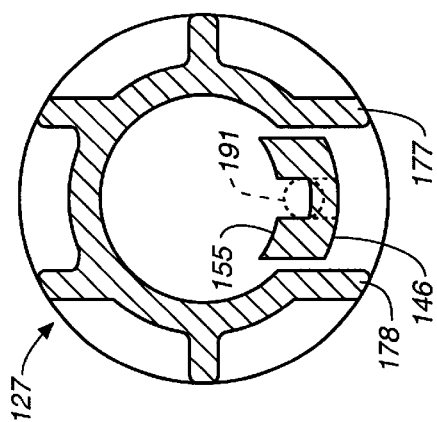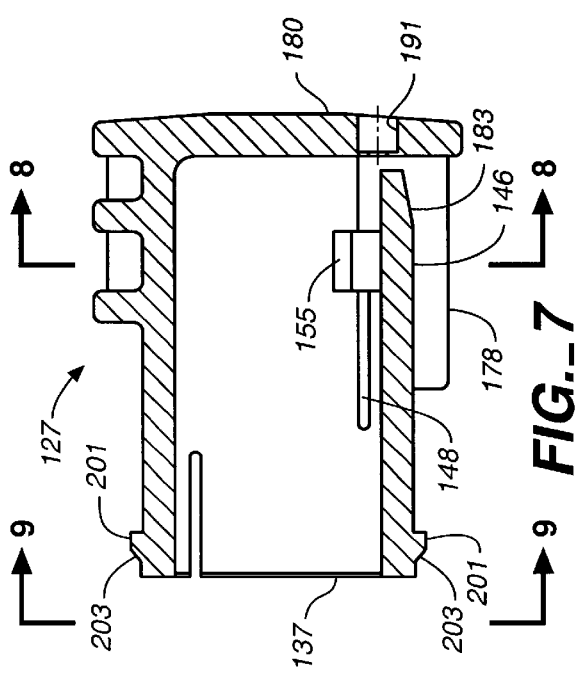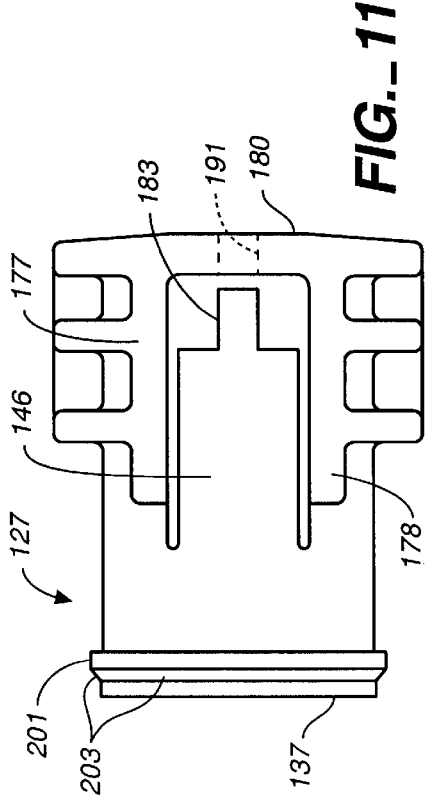

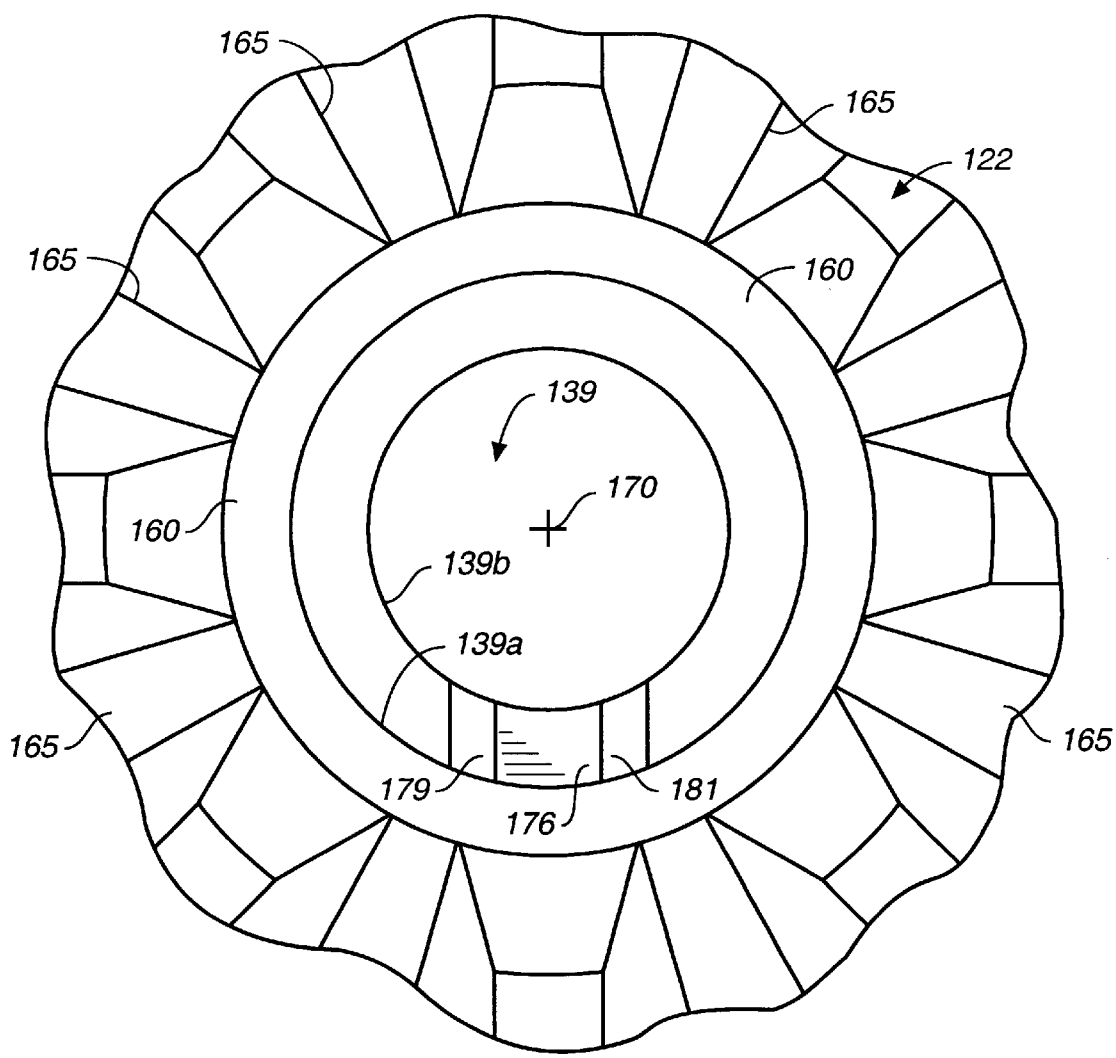
FIG._12

PLASTIC WHEEL ASSEMBLY AND IMPROVED MOUNTING SLEEVE THEREFOR

RELATED APPLICATION

This is a continuation-in-part application based upon copending application Ser. No. 09/507,595, filed Feb. 18, 2000, and entitled PLASTIC WHEEL ASSEMBLY AND MOUNTING SLEEVE THEREFOR.

TECHNICAL FIELD

The present invention relates, in general, to wheel assemblies and the manner of their mounting to and removal from an axle, and more particularly, relates to plastic wheel assemblies of the type used on refuse carts or the like.

BACKGROUND ART

The use of plastic wheels on a variety of products has dramatically increased in recent years. One area where such plastic wheels have been widely employed is on wheeled refuse or garbage carts or bins of the type commonly employed by homeowners for their trash. Typically, these carts are formed of an injection or rotationally molded plastic and have injection or blow molded plastic wheels which are mounted on the ends of a metal axle by a hub member. The wheel hub is hammered onto the end of the axle to hold the wheel in place. Removal of such plastic wheels in order to replace or repair the wheel or the cart has been difficult because the hammered hubs require special tools for their removal or essentially must be destroyed to remove them from the axle. Sometimes this process also damages the axles. Thus, more recently, wheel-mounting assemblies have been devised which snap-on to the axle or axle stub to hold the wheel to the axle.

Prior art snap-on wheel-mounting assemblies, however, have been unduly complex, visually unappealing or not well suited to the shock loading and vibration which is commonly encountered in connection with wheeled refuse carts. Moreover, the cost of prior art snap-on couplings has been undesirably high, as has their rate of failure.

Typical prior art wheel-mounting assemblies can be seen in U.S. Pat. Nos. 2,978,277, 3,907,370, 5,222,786, 5,603,555 and 5,716,107.

In U.S. Pat. No. 2,978,277 to Gaudry a two-piece hub assembly is used to secure a wheel on an axle stub. The two hub halves are forced together to simultaneously capture the head of the axle and a dove-tailed cross section of the wheel. This approach is based, in part, upon mating frictional engagement of the hub halves, but under the shock loading and high vibration which refuse carts typically experience frictional engagement of components can be unreliable. The need for multiple hub pieces and an axle with an enlarged head, also is not desirable.

The wheel-mounting assembly of U.S. Pat. No. 3,907,370 to Bard employs a mounting sleeve which is keyed to slide over the keyed end of a specially formed axle. The sleeve mates with spokes in a wheel recess and is held in place by a washer and cotter pin. An annular cap is placed over the cotter pin and washer. This approach requires axle keying, a plurality of parts and the use of tools to secure and release the cotter pin and cap.

A multiple piece hub assembly is shown in U.S. Pat. No. 5,716,107 to Parker et al. In this wheel-mounting assembly a retainer member is used to lock the wheel assembly on a groove or annular notch at the end of the axle. The hub cover is snapped into the wheel and then the wheel snapped onto the axle. Such notched or grooved axles are in wide spread use in connection with trash carts, but this assembly again requires multiple pieces and, in this case, special tools and tedious manipulation are required in order to release the resilient retainer ring fingers from the inside of the wheel so that the wheel can be removed from the axle.

Two patents which employ sleeve assemblies formed for mounting through the wheel in telescoped relation over the axle are shown in U.S. Patent Nos. 5,222,786 and 5,603,555. The device of U.S. Pat. No. 5,603,555 has a sleeve with at least one snap-acting, axle-engaging shoulder thereon which releasably retains the sleeve on the axle and at least one wheel-engaging shoulder retaining the wheel on the sleeve. As will be seen, however, both of the wheel-mounting sleeve assemblies in these patents are relatively complex and employ a plurality of pieces in order to secure the wheel on the axle.

Accordingly, it is an object of the present invention to provide a wheel assembly and wheel mounting sleeve having a minimum number of parts which can be used to mount plastic wheels, or the like, to a relatively simple grooved metal axle.

A further object of the present invention is to provide a plastic wheel assembly for a trash cart or other wheeled product which is economical to manufacture, easy to mount and to remove to enable repair or replacement of the wheel and/or the product having the wheels, is compact so as to allow its use on a wide variety of different wheeled products and is durable and capable of withstanding substantial shock loads, side-to-side shifting and vibration during normal use.

The wheel assembly and wheel mounting sleeve of the present invention have other objects and features of advantage which will become apparent from, and are set forth in more detail in, the accompanying Drawing and following Best Mode Of Carrying Out The Invention.

DISCLOSURE OF INVENTION

The wheel mounting sleeve of the present invention includes a sleeve body formed and dimensioned for mounting through a central wheel bearing bore of a wheel and formed to be telescoped over an axle. The sleeve has at least one axle-engaging shoulder releasably retaining the sleeve on the axle and at least one wheel-engaging shoulder retaining the wheel on the sleeve. The improvement in the mounting sleeve of the present invention is comprised, briefly, of the sleeve body being formed with a resilient radially displaceable, cantilevered finger carrying an axle-engaging shoulder which extends inwardly from the finger proximate an outer end of the sleeve into an annular notch in the axle, and a wheel-engaging shoulder in the form of an annular rib provided proximate an inner end of the sleeve. The sleeve body and the sleeve-receiving wheel bearing bore are also radially inwardly stepped so that the radially converging wheel spokes on the plastic wheel provide greater strength on the inside of the wheel, where axle torque stresses the wheel to a greater degree.

The present sleeve assembly can be mounted into the wheel and onto the axle without the use of tools, and a simple pointed tool can be inserted into a tool passageway through an end wall of the sleeve to remove the mounting sleeve and wheel from the axle. The tool passageway preferably is cylindrical and dimensioned to prevent use of a blade-type screwdriver and most preferably has a puncture skin thereacross to visually conceal the axle.

A wheel assembly, including a wheel and the mounting sleeve telescoped together, also is provided, as is the further assembly of the axle being telescoped inside the sleeve and wheel.

BRIEF DESCRIPTION OF THE DRAWING

FIG. 1 is a top perspective view of a refuse cart or container having a wheel assembly mounted thereto which is constructed in accordance with the present invention.

FIG. 2 is an enlarged, fragmentary, side elevation view of the wheel assembly and wheel mounting sleeve of the present invention.

FIG. 3 is a fragmentary, side elevation view, in cross-section, of the sleeve of FIG. 2 showing the sleeve coupled to a wheel and to an axle and mounted by a spacer to a refuse cart or container.

FIG. 4 is a side elevation view corresponding to FIG. 3, without the axle, showing an alternative embodiment of the sleeve and wheel bore.

FIG. 5 is an end elevation view of the sleeve of FIG. 4.

FIG. 6 is a further enlarged, side elevation view, in cross section, corresponding to FIG. 5 of a further alternative embodiment of the sleeve and wheel bore.

FIG. 7 is a reduced side elevation view corresponding to FIG. 6 of the sleeve alone.

FIG. 8 is an end elevation view, in cross section taken substantially along the plane of line 8—8 in FIG. 7.

FIG. 9 is an end elevation view taken substantially along the plane of line 9—9 of FIG. 7.

FIG. 10 is an end elevation view of the end of the sleeve of FIG. 7 opposite to the end shown in FIG. 9.

FIG. 11 is a bottom plane view of the sleeve of FIG. 7.

FIG. 12 is an enlarged, fragmentary, end elevation view of the wheel and wheel bearing bore of FIG. 6 with the sleeve removed.

BEST MODE OF CARRYING OUT THE INVENTION

The wheel mounting sleeve and wheel assembly of the present invention can be used in connection with numerous wheeled devices. A typical, but not limiting, application is to employ the same in a wheeled refuse cart or container of the general type shown in FIG. 1. Thus, cart 21 includes a pair of wheels 22 mounted on an axle 23 to the lower end of the cart body 29. A hinged lid 24 optionally can be provided, and the cart can be tilted or tipped about the wheels using handle 26 so as to enable rolling of the cart for the transport of refuse, for example, between a location for filling the cart and a location for pickup by a refuse disposal company.

Wheels 22 are secured on axle 23 by a wheel mounting sleeve, generally designated 27. In the refuse cart illustrated, body 29 of the cart includes a wheel well or recess area 28 which receives wheels 22, in part to protect the wheels and in part as a cosmetic structure. Many carts, however, do not include wheel wells as illustrated.

The embodiments of FIGS. 2–5 are described in detail in my copending application, Ser. No. 09/507,595, which is incorporated herein by reference, and they will be described in less detail in this application.

In FIG. 2, it will be seen that axle 23 is mounted to the body 29 of the refuse cart by a downwardly-depending ear 31. Typically, there will be a plurality of ears 31, for example four, across the width of the cart body and each ear 31 will be formed with a bore 32 which rotatably receives axle 23.

The various manufacturers of refuse carts and similar wheeled devices will each have their own cart configuration and manner of mounting the support wheels to the cart. A common element which virtually all cart manufacturers use, however, is an axle constructed as shown in FIG. 2. Thus, axle 23 typically includes an annular groove or notch 33 proximate each end. Moreover, the ends are chamfered at 34 so as to facilitate insertion of the axle into wheel bearing bores and various mounting structures.

Cart manufacturers often buy plastic wheel assemblies from outside suppliers. The wheel assembly suppliers, therefore, are able to construct a wheel which mounts to the standard industry axle 23 using various wheel mounting structures, and the cart manufacturers assemble the same to form refuse cart 21.

Referring now to FIGS. 2 and 3, further details of construction of wheel 22 and wheel mounting sleeve 27 can be set forth. Wheel mounting sleeve 27 includes a body 36 having an inner end 37, which is closest to cart 21, and an outer end 38, which is outwardly facing away from cart 21. The sleeve body is formed and dimensioned for mounting through a wheel bearing bore, generally designated 39, in wheel 22. Moreover, body 36 of sleeve 27 is also formed with a central bore 41 which is dimensioned for sliding telescopic insertion over axle 23. The wheel, sleeve and axle are secured together by further forming sleeve 27 with at least one axle-engaging shoulder 42 and at least one wheel-engaging shoulder 43.

In sleeve 27 of the present invention, sleeve body 36 is formed with two resilient, radially displaceable, axially extending, cantilevered fingers 46 and 47. Fingers 46 and 47 are cantilevered and extend axially in opposite directions along the axial length of body 36.

Sleeve fingers 46 and 47 are formed by pairs of longitudinally extending slots which terminate somewhat more than half-way along the axial length of body. End 83 of finger 46 stops short of sleeve end wall 58 so that finger 46 can be outwardly displaced to the dotted line position shown in FIG. 3. Fingers 46 and 47 will resiliently snap back automatically to the solid line position shown in the figures when the force displacing the fingers are not present. The length of the finger-defining slots is selected, based upon the sleeve wall thickness and material, to enable sufficient flexure for fatigue-free displacement of axle-engaging shoulder 42 in and out of engagement with axle notch 33 and the wheel-engaging shoulder 43 into and out of engagement with the wheel shoulder 64.

Resilient fingers 46 and 47 are circumferentially spaced from each other by approximately 180° so that the slots in the body of the sleeve do not weaken the overall sleeve strength significantly.

Axle-engaging shoulder 42 is preferably provided on a lug 55 which extends radially inwardly into bore 41 in the sleeve. As best may be seen in FIG. 3, the axle-engaging shoulder 42 bears upon a shoulder 57 defining axle notch 33. Thus, shoulder 42 engages shoulder 47 to prevent displacement of axle 23 in an inward direction out of sleeve 27. Preferably, a pair of oppositely facing shoulders will be provided. Relative displacement of axle 23 inside sleeve 27 in an outward direction toward end 38 of the sleeve is limited by a second axle-engaging shoulder axially spaced from first-named shoulder 42. In the preferred embodiment, the second axle-engaging shoulder is provided by an end wall 58 on sleeve 27 which engages end 59 of axle 23. Thus, sleeve 27 is latched in a fixed axial position on axle 23 by engagement of the axle-engaging shoulder 42 with notched defining shoulder 57 and by engagement by end 59 of the axle with end wall 58 of the sleeve.

As best can be seen in FIG. 2, the wheel surface against which wheel-engaging shoulder 43 bears is preferably provided by a notch or pocket 64 which is recessed from the inner side 66 of the wheel. This allows the sleeve 27 to be latched to the wheel without extending beyond the inner side 66.

FIG. 3 illustrates sleeve 27 of the present invention as mounted and latched in place in wheel 22, and it will be seen that it does not extend beyond either inner side 66 or outer side 67 of the wheel. The radially outwardly extending second wheel-engaging shoulder 62 on the sleeve engages shoulder 63 on the wheel and is axially spaced from the first-named shoulder 43 and faces toward inner end 37 of the sleeve.

In the preferred form of wheel mounting sleeve of the present invention, the diameter of central bore 41 through the sleeve is dimensioned to freely rotate on axle 23. The sleeve finger latching structure as shown in the drawings, in effect, also keys the sleeve so that it rotates as a unit with the wheel, making it preferable for the sleeve to rotate on the axle.

Having described the principal features of mounting sleeve 27 and wheel assembly 22 of the present invention, the manner of employing the sleeve to mount the wheel to axle 23 can be set forth. Sleeve 27 can be inserted into wheel bearing bore 39 by simply sliding the wheel axially in the direction of arrow 71 in FIG. 2. Mounting sleeve 27 should be aligned so that lug 61 on resilient finger 47 is aligned with a ramp 72 in bore 39. As best may be seen in FIG. 2, ramp 72 tapers inwardly from an outer large diameter portion 39a of bore 39 to an inner small diameter portion 39b of the wheel bearing bore. It is preferable that lug 61 be formed with a ramp or tapered section 73 which slidably engages ramp 72 in bore 39. The lug ramp and bore ramp, therefore, cooperate to urge resiliently displaceable finger 47 inwardly to the broken line position as shown in FIG. 3. This allows lug 61 to pass into small diameter portion 39b of the bearing bore until the wheel-engaging shoulder 43 passes beyond the oppositely facing shoulder 64 in bore 39. Once shoulder and lug 43 pass beyond wheel shoulder 64, finger 47 snaps outwardly into the notch 74 which is formed to receive lug 61, as shown in FIG. 2.

In order to further enhance the alignment of sleeve 27 in bore 39, bore 39 can be provided with a second ramp 76 (FIG. 2) which is dimensioned to pass between axially extending spaced apart ribs 77 and 78 (see FIG. 5) on sleeve 27. Recesses or pockets are provided on either side of ramp 76 and are dimensioned to receive the ends of axially extending ribs 77 and 78. Thus, the pockets further key the sleeve to the wheel and cause seating of sleeve 27 in the proper alignment for snap-acting latching of lug 61 in pocket 74 as the sleeve is moved inwardly in bore 39. Typically, the wheel with the sleeve 27 snapped in place will now be shipped to the cart manufacturer.

In order to assemble wheel 22 to axle 23, the wheel normally will be moved in the direction of arrow 82 (see FIG. 2) over chamfered end 34 of the axle. This will cause the bore 41 in sleeve 27 to slide over the axle until the inwardly extending lug 55 engages chamfered end 34 of the axle. As the wheel and sleeve and urged further inwardly over the axle, chamfered end 34 outwardly displaces lug 55 and resilient finger 46 to the dotted line position of FIG. 3 so that lug 55 can pass over the end of the axle until it snaps into annular notch 33. This occurs at about the same time that axle end 59 reaches, or is very closely proximate to end wall 58 of the sleeve. The result is that first, outwardly facing axle-engaging shoulder 42 snaps in behind the inwardly facing shoulder 57 on the axle, while the second, inwardly facing, axle-engaging shoulder or wall 58 abuts end 59 of the axle so as to prevent relative axial movement of axle 23 and the sleeve and wheel assembly.

As will be seen from FIG. 3, it is preferable that outer end 83 of finger 46 be inwardly tapered so as to enable resilient outward displacement of finger 46 without engaging the large diameter portion 39a of the wheel bearing bore.

One of the substantial advantages of the mounting sleeve of the present invention is that it is sufficiently compact so as not to extend from either side of wheel 22. Thus, the mounting sleeve and wheel of the present invention can be used on a wide variety of wheeled carts, containers, vehicles and the like, either by snapping the wheel assembly directly onto the axle, or by adding a spacer 86, as shown in FIG. 3 in solid lines and in FIG. 2 in broken lines. For some carts, spacer 86 would not be employed, but the configuration of wheel receiving well 28 may be such that it would be advantageous, or necessary to employ a spacer sleeve 86.

One of the substantial advantages of the wheel mounting sleeve and wheel assembly of FIGS. 1–3 is that the various components can be disassembled using only a simple blade-type screwdriver. End wall 58 of sleeve 27 is formed with an opening or tool passageway 91 through to bore 41 which provides access to end 83 of resilient finger 46. Thus, a screwdriver blade can be placed on the upwardly facing surface 92 of finger 46 and the resilient finger displaced downwardly until lug 55 clears annular notch 33 on the axle. This releases the sleeve from the axle and thereby allows the wheel and sleeve to be moved outwardly so as to separate the wheel assembly from axle 23. Outward extension 83, beyond the axle-engaging should 42, is provided, therefore, to enable release of the sleeve from the axle.

In the sleeve-wheel assembly of FIGS. 1–3, once the wheel has been removed from the axle, a blade screwdriver also can be used to push down on a step or notch 93 in lug 61 in order to cause resilient displacement of finger 47 to the dotted line position in FIG. 2. Such displacement releases lug 61 from notch 74. The sleeve can then be urged axially outwardly of wheel bearing-bore 39. This easy disassembly process can be performed by the home owner using the simplest of tools so as to enable replacement of a damaged wheel or axle or sleeve. Obviously, both the wheel and cart manufacturers also can easily perform the disassembly task, and then the wheel can be remounted to the axle without tools.

In the preferred form, mounting sleeve 27 is monolithically formed as a one-piece member from a relatively impact resistant plastic. This can be accomplished by injection molding sleeve 27 from a plastic such as an acetyl-based copolymer.

While the sleeve and wheel assembly of FIGS. 1–3 is suitable for use for many applications, it has been found that greater strength and durability can be achieved in the wheel-sleeve connection if the inner end 37a of the sleeve includes an outwardly projecting rib 101, as shown in the embodiments of FIGS. 4 and 5. Thus, as shown in FIGS. 4 and 5, sleeve 27a is formed with an annular, radially outwardly projecting rib 101 at inner end 37a which is matingly received in annular recess 102 in the inner end of wheel bearing bore 39b.

Sleeve 27a must be press-fit or driven into the wheel bore because the diameter of annular rib 101 is greater, for example, by about 0.040 to 0.100 inches, than the small or inner diameter bore portion 39b. A rib height of 0.050 inches is preferred. Accordingly, rib 101 preferably has a chamfer 103 on its leading edge to facilitate insertion. In the form of sleeve shown in FIGS. 4 and 5, the slots 52 and 53, which define a finger 47, also function to allow inward collapsing of the sleeve inner end 37a to allow passage of rib 101 down the smaller bore portion 39b until the rib can resiliently expand outwardly into recess 102. The circumferentially extending rib 101 interlocks or seats with recess 102 in a manner which better stabilizes sleeve 27a against side-to-side shifting or relative movement in wheel bore 39a, 39b. Reduction of relative movement further resist axial separation of the sleeve and wheel, as well as reducing vibration wear of the parts. It will be understood that annular rib 101 need not extend around the entire circumference of the sleeve body, but instead could be provided by a plurality of annular rib segments.

The sleeve of FIGS. 4 and 5 is best inserted using a mounting fixture which presses outer end 38a of sleeve 27a into the wheel bearing bore 39a, 39b, but a hammer also can be used. Removal of sleeve 27a is more difficult as a result of rib 101 and recess 102. Depending on the rib height, removal may require destruction of sleeve 27a and/or the wheel. A rib of 0.050 inches, for example, will be difficult to remove, even with tools, without damage to the sleeve and/or wheel bore. The assembly's durability is so significantly increased by the presence of the rib, however, as to be an acceptable trade-off.

Turning now to the improved embodiment of the sleeve and wheel assembly of the present invention, as shown in FIGS. 6–12, it will be seen that a sleeve 127 is similar in construction to sleeve 27a of FIGS. 4 and 5 in that inner end 137 of sleeve 127 is provided with an annular rib 201 which seats in an annular recess 202 in the inner end 139b of wheel bearing bore 139. As above described in connection with FIGS. 4 and 5, therefore, rib 201 has a diameter which is greater than small diameter bore 139b, and the sleeve is press fit down bore 139 until rib 201 resiliently snaps out into recess 202. The same relative dimensions as set forth for the sleeve rib and bore diameter of the embodiment of FIGS. 4 and 5 are suitable for the embodiment of FIGS. 6–12.

In order to facilitate passage of rib 201 down smaller diameter bore 139b, the body of sleeve 127 is preferably axially slotted at inner end 137 at least once. This can best be seen in FIG. 9, wherein two axially extending slots 151 and 152 are provided. Slots 151 and 152 accommodate resilient inward displacement of sleeve end 137 by an amount substantially equal to the interference fit between rib 201 and inner bore portion 139b. Slots 151 and 152 define a finger 147 therebetween which is resiliently inwardly displaceable by an amount, which when combined with the natural resilience of the softer blow molded plastic of wheel 122, will allow press fitting of the sleeve down the bore until the rib can snap out into recess 202 and latch the sleeve to the wheel. In order to facilitate such a press fitting of the sleeve into the wheel, a chamfer 203 can be provided on rib 201.

As best may be seen in FIG. 6, wheel bore 139 is radially stepped and has a large diameter end portion 139a opening to outer side 167 of wheel 122 and a small diameter bore portion 139b, opening to inner side 166 of the wheel. This same radial inward stepping of the sleeve and wheel are also shown for the embodiment of FIGS. 1–3 and the embodiment of FIGS. 4 and 5.

Wheels employed in refuse carts are typically blow molded plastic wheels with radially extending ribs 165 which converge toward central axis 170 of bore 139. By inwardly stepping bore 139 from the outer or large diameter bore portion 139a to the inner smaller diameter portion 139b, the wheel assembly of the present invention will have greater strength at inner side 166 of the wheel and inner side 137 of the sleeve. This results from the radial convergence of ribs 165 toward axis 170 of the bore (FIG. 12). As inner bore portion 139b is made smaller, ribs 165 become closer together at the annular bearing collar 150 which surrounds bore 139b. An axle which is inserted into sleeve bore 141 will tend to stress inside 166 of the wheel more than the outside 167. As the diameter of the sleeve-receiving bore of the wheel decreases, ribs 165 converge towards bearing collar 150 so as to support bearing collar 150 around sleeve 127 and provide additional strength, as compared to the larger diameter annular bearing collar 160 (FIGS. 6 and 12) on outside 167 of the wheel. At outer side 167 wheel radial spokes 167 are not converged as much and there is a greater circumferential space between spokes 165 as they meet and provide radial support for wheel collar portion 160. This spacing is significant in plastic blow molded wheels which are softer than the insert plastic sleeves.

Thus, a significant feature of the wheel assembly of the present invention is that the sleeve is radially stepped and inner bore portion 139b has a smaller diameter than outer bore portion 139a to thereby allow convergence of the radial wheel ribs 165 to a greater degree providing support for the wheel against stress produced by relative tilting of axle 123 with respect to bore axis 170.

In the sleeve assembly of FIGS. 1, 2 and 3, sleeve 27 is formed with an opening 91 (see FIG. 3) which is dimensioned to receive the blade of a screwdriver so that the extension on resilient finger 46 can be pried radially outwardly to release the sleeve and thus the wheel from the axle. In some applications in which the refuse carts are exposed to unsupervised use, there are disadvantages to a sleeve construction which has a relatively large opening or tool passageway that reveals the axle. Such large tool passageways can act as an attractive nuisance encouraging vandals to release the wheel from the axle using such a commonly available tool as a blade-type screwdriver.

One way to overcome the vandalism problem is simply to eliminate tool passageway 91. A preferred compromise, however, is shown in the improved sleeve assembly 127. End wall 158 of the sleeve is formed with a tool passageway 191 which is aligned with extension 183 of resilient finger 146. Extending transversely across passageway 191 is a frangible membrane or puncture skin 195. Membrane 195 visually conceals axle 123 to thereby reduce the likelihood of vandalism. Moreover, passageway 191 is preferably cylindrical and has a lateral dimension which is sufficiently small so as to prevent the entry of most blade-type screwdrivers into the passageway. Instead, a pointed tool such as a "scratch all" or an icepick can be used to puncture membrane or puncture skin 195 and displace latching finger 146 by prying it upwardly. Alternatively, as the pointed tool is driven axially toward the lugs 155 on resilient finger 146, the end of the pointed tool will engage chamfer 134 on the end of axle 123. As the pointed tool is urged axially further, chamfer 134 will force the end of the tool up against finger extension 183 and thereby outwardly displace finger 146 until lugs 155 clear annular notch 133 in the axle. At this point, the wheel and sleeve can be pulled outwardly from the axle and the wheel removed.

It will be understood that puncture skin 195 can occur anywhere along passageway 191 from the outermost surface 180 to the innermost surface. Moreover, as best can be seen in FIG. 6, it is preferable that end wall 158 have an outermost surface 180 which is slightly convexed so as to increase the overall strength of the sleeve.

The molding of a skin or membrane 195 across passageway 191 makes it desirable to use certain mold slides which also made modifications to the sleeve 127, as compared to sleeve 27, desirable. Thus, lug 55 in sleeve 127 has been bifurcated into two lugs 155, defining a notch 140 therebetween, that is essentially aligned with tool passageway 191, as best may be seen in FIG. 9. Additionally, as shown in FIG. 11, the extension 183 does not extend over the full width of finger 146, but instead is a central extension 183 which also is axially aligned with passageway 191. This provides openings on either side of the extension 183 which permits mold slides.

Referring now to FIG. 12, wheel 122 can be seen to be formed with a central wheel bearing bore 139 having stepped large diameter bore portion 139a and smaller diameter bore portion 139b. The ramp 72 provided in wheel assembly 22, however, is not present in the bore 139 of wheel 122. This is because the lug 61 on arm 47 is not present on sleeve 127. Instead a much smaller radial extending rib 201 is used to latch the sleeve to the wheel, as above described.

As was the case of wheel assemblies of FIGS. 1–5, however, the wheel assembly of FIGS. 6–12 is constructed so that the sleeve and wheel are keyed together as a unit. Thus, one of wheel bearing bore 139 and sleeve 127 is formed with a radially projecting key, while the other of the wheel bearing bore and the sleeve is formed with a radially projecting recess. As can be seen from FIG. 12, a pair of outwardly projecting axially extending pockets recesses 179 and 181 are provided in small diameter wheel bearing bore portion 139b. These are spaced apart on either side of the central section 176, which can take the form of a ramp similar to ramp 76 in FIG. 3, but which need not be a ramp. The key is preferably provided by a pair of outwardly extending ribs 177 and 178 which are dimensioned to be slidably inserted into notches 181 and 179. This structure keys the sleeve for rotation with the wheel.

The foregoing description of specific embodiments of the present invention has been presented for the purpose of illustration. It is not intended to be exhaustive or to limit the invention to precise forms disclosed, and obviously many modifications and variations are possible in light of the above teaching. The embodiments were chosen and described in order to best explain the principles of the invention and its practical application in order to thereby enable others skilled in the art to best utilize the invention and various embodiments with various modifications as are suited to the particular use contemplated. It is intended that the scope of the invention be defined by the claims appended hereto, when read and interpreted according to accepted legal principles such as the doctrine equivalents and reversal of parts.

What is claimed is:

1. In a wheel mounting sleeve including a sleeve body having an inner end and an outer end and formed and dimensioned for mounting through wheel bearing bore in a wheel and into telescoped relation over an axle, said sleeve having at least one axle-engaging shoulder thereon retaining said sleeve on said axle and at least one wheel-engaging shoulder thereon retaining said wheel on said sleeve, the improvement comprising:

said sleeve body being formed with at least one resilient, radially displaceable, axially extending, cantilevered finger, said axle-engaging shoulder extending radially inwardly from said finger proximate said outer end of said sleeve and said wheel-engaging shoulder being an annular radially outwardly projecting rib proximate said inner end of said sleeve, and said inner end of said sleeve being formed with at least one slot therein extending from said inner end toward said outer end by a distance sufficient to enable inward flexing of said rib for mounting to said wheel.

2. The wheel mounting sleeve as defined in claim 1 wherein, said sleeve body is formed with two resilient, radially displaceable, axially extending, cantilevered fingers, said fingers being cantilevered from and extending in opposite axial directions on circumferentially separated sides of said body, said at least one slot being provided by a pair of slots extending to said inner end to define the other of said fingers, and a portion of said rib projecting radially outwardly from the other of said fingers proximate said inner end of said sleeve.

3. The wheel mounting sleeve as defined in claim 2 wherein, said wheel-engaging shoulder faces toward said outer end of said sleeve, and said body is formed with a radially outwardly extending second wheel-engaging shoulder axially spaced from the first-named wheel-engaging shoulder and facing toward said inner end of said sleeve.

4. The wheel mounting sleeve as defined in claim 2 wherein, said axle-engaging shoulder faces toward said outer end of said sleeve, and said body is formed with a radially inwardly extending second axle-engaging shoulder axially spaced from the first-named wheel-engaging shoulder and facing toward said inner end of said sleeve.

5. The wheel mounting sleeve as defined in claim 1 wherein, said outer end of said sleeve body is formed with a transversely extending end wall extending across said wheel bearing bore, and a tool passageway extending partially through said end wall and having a frangible membrane extending transversely thereacross, said passageway being dimensioned for passage of a tool through said passageway after piercing of said frangible means to enable radially outward displacement of said axle-engaging shoulder by said tool to a position releasing said sleeve from said axle.

6. The wheel mounting sleeve as defined in claim 5 wherein, said tool passageway is cylindrical and dimensioned to receive a pointed cylindrical tool.

7. The wheel mounting sleeve as defined in claim 5 wherein, said frangible membrane is a puncture skin positioned across said passageway proximate an inner end thereof.

8. The wheel mounting sleeve as defined in claim 5 wherein, said finger carrying said axle-engaging shoulder further includes an extension portion extending axially outwardly of said axle-engaging shoulder for engagement by a tool to enable radial outward displacement of said finger.

9. The wheel mounting sleeve as defined in claim 8 wherein, said extension portion is axially aligned with said passageway and positioned for radial outward displacement upon engagement of said tool with a chamfered end of said axle and axial inward displacement of said tool.

10. The wheel mounting sleeve as defined in claim 5 wherein, said end wall is defined in part by a convex outer surface.

11. The wheel mounting sleeve as defined in claim 8 wherein, said axle-engaging shoulder is provided by a pair of laterally spaced shoulders axially aligned on opposed sides of said tool passageway, and said extension portion is axially aligned with said passageway and has a lateral dimension about equal to a lateral dimension of said passageway.

12. The wheel mounting sleeve as defined in claim 1 wherein, said body includes at least one axially extending key portion formed to cooperatively engage at least one recess in said wheel bearing bore to cause said sleeve to rotate with said wheel.

13. The wheel mounting sleeve as defined in claim 1 wherein, said sleeve is injection molded from an acetyl-based copolymer plastic.

14. The wheel mounting sleeve as defined in claim 1 wherein, said rib is chamfered in a direction of insertion of said sleeve into said wheel bearing bore.

15. The wheel mounting sleeve as defined in claim 1 wherein, said body has a diameter proximate said outer end of said sleeve, greater than a diameter proximate an inner end of said sleeve.

16. A wheel assembly comprising:

an axle having a circumferentially extending notch proximate and inwardly of an axially outer end thereof;

a wheel having a central wheel bearing bore therein with a large diameter portion proximate an outer side thereof and a small diameter portion proximate an inner side thereof, said small diameter portion further being formed with a radially outwardly stepped annular recess proximate said inner side; and a wheel mounting sleeve having a body formed with a bore therethrough dimensioned for, and slidably mounted over, said axle; said body being radially stepped along its length and having an inner diameter end formed for, and slidably inserted into, said small diameter portion of said wheel bearing bore and having an outer diameter formed for, and slidably inserted into, said large diameter portion of wheel bearing bore; said body further being formed with a resilient, radially displaceable, axially extending, cantilevered finger thereon extending from a middle of said sleeve toward an outer end of said sleeve, said finger having a radially inwardly extending axle-engaging shoulder thereon mounted in said notch and engaging said axle; and an annular rib projecting outwardly from said inner end of said sleeve matingly received in said annular recess in said small diameter portion of said wheel bearing bore.

17. The wheel assembly as defined in claim 16 wherein, said inwardly facing surface on said wheel is provided by an annular recess in said wheel bearing bore at an inner side of said wheel receiving said annular rib.

18. The wheel assembly as defined in claim 16 wherein, one of said wheel bearing bore and said sleeve is formed with a radially projecting key and the other of said wheel bearing bore and said sleeve is formed with a radially projecting recess, said key being interengaged with said recess to prevent relative rotation of said sleeve in said wheel bearing bore.

19. The wheel assembly as defined in claim 18 wherein, said key is provided by a pair of outwardly projecting axially extending ribs on said sleeve, and said recess is provided by a pair of axially extending recesses in said wheel bearing bore.

20. The wheel assembly as defined in claim 16 wherein, said rib extends circumferentially around a majority of said inner end of said sleeve, and said rib is formed with an inwardly facing chamfer thereon to facilitate insertion of said sleeve into said bore.

21. The wheel assembly as defined in claim 16 wherein, said sleeve has an outer end wall extending across and substantially closing said wheel bearing bore at an outer side thereof, and said end wall is formed with a tool passageway extending axially therein, said passageway further having a puncture skin thereacross formed for puncturing by a tool; and said cantilevered finger is aligned with said tool passageway and said tool passageway is positioned to enable radial displacement of said finger by a pointed tool to release said sleeve from said axle.

22. The wheel assembly as defined in claim 21 wherein, said end wall has a convex outer surface, and said puncture skin is positioned proximate an inner surface of said end wall.

* * * * *